United States Patent Office 3,291,651
Patented Dec. 13, 1966

3,291,651
DYEING ANODIZED ALUMINUM WITH
COBALTIFEROUS AZO-DYESTUFFS
Jakob Brassel, Basel, Switzerland, assignor to Ciba Limited, Basel, Switzerland, a Swiss company
No Drawing. Filed Dec. 26, 1962, Ser. No. 247,270
Claims priority, application Switzerland, June 21, 1957,
47,519/57
22 Claims. (Cl. 148—6.1)

This is a continuation-in-part of my copending application Serial No. 740,604, filed June 9, 1958 (now abandoned).

Certain classes of metallized and particularly chromiferous azo compounds have long been known as highly satisfactory fast dyes for animal fibers such as wool and silk. Other metallized azo dyestuffs in which the metal ranges from aluminum to iron, i.e. across groups IV, V, VI, VII, VIII and I of the Periodic Table of Mendeleev, have long been known as suitable for dyeing oxide films on aluminum or aluminum alloys. However, there was missing a dyestuff that would be equally well suited for the dyeing of animal fibers on the one hand and of anodized aluminum or its alloys on the other hand, and yet would show completely satisfactory fastness in particular to light. The art sought especially dyestuffs with the aforesaid properties which would dye anodized aluminum in light fast black shades.

This invention provides, as such valuable new dyestuffs, complex cobalt compounds of monoazo-dyestuffs which containing sulfonic groups and correspond to the general formula (1) 

in which R represents a hydroxy-benzene radical which contains a nitro group and is bound to the azo linkage in ortho-position to the hydroxyl group, A represents a naphthalene radical to which the group Y is bound in a position vicinal to the azo linkage, and Y represents an at most secondary amino group, and more especially a free amino group.

The invention also provides a process for the manufacture of the aforesaid dyestuffs, wherein a monoazo-dyestuff which contains a sulfonic acid group and corresponds to the above Formula 1 is treated with an agent yielding cobalt.

The new cobaltiferous dyestuffs yield on anodically oxidized aluminum, or alloys thereof which resemble aluminum with respect to anodic oxidation, very valuable dyeings which are usually distinguished by their very good fastness to climatic conditions and light. These dyeings are particularly valuable because they comprise deep black to greenish black tints which are very fast to light and climatic conditions.

As far back as 1933, Anderau (U.S. Pat. No. 2,030,236) had already taught the art that oxide films on aluminum or alloys thereof may be dyed with certain metalliferous azo dyes. It is stated by Anderau that cobaltiferous dyestuffs, from among the metal-containing azo dyes of the above arrangement, dye aluminum grey blue in one instance, and violet brown in another and no suggestion is made of an amino group in 1-position at the naphthalene ring of the coupling component while such amino group plays a decisive part in my compounds.

Moreover, cobalt is one of the less important metals according to Anderau who favors the choice of chromium, copper, and even nickel and iron.

In 1939, Hanhart and Pieth (U.S. Pat. No. 2,171,828) invented chromium complexes of the same general class of azo-dyestuffs, of which I claim certain cobalt complexes, and they found that these chromium-containing dyestuffs are suitable particularly for dyeing wool and silk in greenish blue to violet shades fast to light and to milling.

Almost a decade later, in 1948, Mackenzie and Nestler (U.S. Pat. No. 2,434,173) still teach the art that among the metallized dyes, those metallized with chromium have achieved great importance for dyeing wool, and disclose certain improved dyestuffs among which there is, in their Example 6, a dyestuff of the same unmetallized dyestuff class from which I have derived the novel cobalt-complexes. The Mackenzie et al. dyestuff yields reddish-grey dyeings on wool.

In 1956 Schetty (U.S. Pat. No. 2,730,522) suggests cobaltiferous dyestuffs of substantially the arrangement

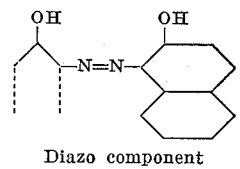

Diazo component which is clearly distinguished from my compounds by the fact that the vicinal position to the azo bridge at that ring is occupied by the hydroxyl group. In this respect, Schetty is similar to Anderau although twenty years later, however, with the important difference that Schetty teaches the art that his dyestuffs are particularly suited for the dyeing of wool, and synthetic fibers and that they differ from the comparable chroms compounds in that they generally have a new shade, generally strongly shifted towards the hypsochrome, and show, on wool, an even better fastness to light.

The better light fastness does not result from the arrangement of the azo bridge in β-position at the naphthalene moiety; it is exclusively based on the presence of hydroxyl groups vicinal to the azo bridge in both the diazo and the coupling component. More cobaltiferous dyestuffs of the same specific class of Schetty and Anderau are also disclosed by Zickendraht and Buehler in U.S. Patent 2,776,956 as suitable for obtaining wool dyeings in different grey shades.

This patent to Zickendraht also discloses cobaltiferous dyestuffs with the amino group in 1-position at the naphthalene ring and further substituted with sulfonamide groups, which dyestuffs afford dyeings on wool in blue, bluish green, or reddish blue shades. It is the express teaching of this patent that the monoazo dyestuffs involved must not contain any free sulfonic acid or carboxyl group (column 1, line 6 and lines 35/36, and column 2, lines 58 to 62). The Zickendraht patent must be considered the latest state of the art actually contemporaneous with the present invention, and thus revealing the trend in the art as it developed since the thirties up to the time of this invention.

More than that, this patent together with the Zickendraht et al. patents, 2,814,576 and 2,820,784 confirm a most pronounced trend established in the art:

Zickendraht and Buehler, in the last named patent, also favor the amino group in 2-position in the naphthalene coupling component and the 1-position of the azo bridge, and thus revert to again the general line followed in the prior art, namely to consider the arrangement

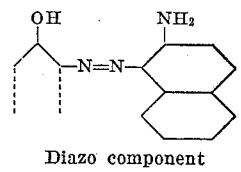

Diazo component more favorably than the arrangement

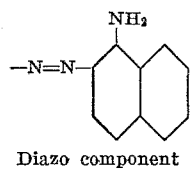

Diazo component

Still more important, however, is the fact that they teach that these dyestuffs yield olive to greyish-green and also blue wool dyeings which are distinguished by good levelling capacity, good fastness to light and very good fastness to washing, fulling, carbonizing and decatizing.

In contrast thereto, the third patent of this group, namely 2,814,576 to Zickendraht and Wittwer continues the general teachings of Anderau supra with regard to dyeing anodized aluminum, in that it requires the presence of the same two hydroxyl groups in vicinal positions to the azo bridge at the diazo and at the coupling component nuclei, respectively, as does Anderau. Moreover, the tints obtained with these dyestuffs, are copper red to bluish red, i.e. they confirm the hypsochromic effect taught by Schetty even for anodized aluminum. The chromium complex of Example 2 of Anderau yields blue dyeings, the cobalt complex the weaker grey blue, the nickel complex, however, blue violet, i.e. a bathochromic effect. One is inclined to think that a person skilled in the azo art, with the entire picture as revealed by the mentioned patents before him, would have for obtaining black shades on aluminum thought of experimenting with nickel and iron rather than with cobalt. It should be noted that Anderau obtains black dyeings on anodized aluminum with iron complexes.

The new monoazo-dyestuffs of the above Formula 1 can be obtained by coupling an ortho-hydroxy-diazo-compound of the benzene series with an aminonaphthalene capable of coupling in a position vicinal to the amino group, and so selecting the starting materials that at least one of them contains a sulfonic acid group.

Thus, the monoazo-dyestuffs of the Formula 1 may contain a sulfonic acid group in the radical R and/or in the radical A, or they may contain two sulfonic acid groups in the radical A while R contains one or two nitro groups, if desired, in addition to other substituents customarily present in monoazo-dyestuffs, such as halogen atoms or alkyl groups.

As examples of ortho-hydroxy-diazo-compounds of the benzene series, which are used as starting materials for making the dyestuffs of this invention, there may be mentioned diazo compounds of the following amines: 4-nitro-2-amino-1-hydroxybenzene-6-sulfonic acid and 6-nitro-2-amino-1-hydroxybenzene-4-sulfonic acid, and also diazo-components that are free from sulfonic acid groups and must be coupled with a naphthylamine containing a sulfonic acid group, such as diazo-compounds of 4-nitro-2-amino-1-hydroxybenzene,
5-nitro-2-amino-1-hydroxybenzene,
4-chloro-5-nitro-2-amino-1-hydroxybenzene,
4-methyl-5-nitro-2-amino-1-hydroxybenzene,
4-nitro-6-chloro-2-amino-1-hydroxybenzene,
4-nitro-6-actylamino-2-amino-1-hydroxybenzene,
6-nitro-4-acetylamino-2-amino-1-hydroxybenzene,
6-nitro-4-methyl-2-amino-1-hydroxybenezne,
6-nitro-4-chloro-2-amino-1-hydroxybenzene or
4:6-dinitro-2-amino-1-hydroxybenzene.

As coupling components there are used aminonaphthalenes which are capable of coupling in a position vicinal to a primary or secondary amino group and which may contain sulfonic acid groups. When a diazo-component containing a sulfonic acid group is used, it may be coupled with an amino naphthalene free from sulfonic acid groups, such as 6-bromo- or 6-methoxy-2-aminonaphthalene, 6-methyl-2-aminonaphthalene or advantageously 2-aminonaphthalene itself. Instead of the last mentioned component 2-aminonaphthalene-1-sulfonic acid may be used, because, as is known, the sulfonic acid group in the 1-position splits off when this acid couples, so that it leads to the same dyestuffs as does 2-aminonaphthalene. The aforesaid diazo-compounds which are free from sulfonic acid groups are coupled with aminonaphthalene sulfonic acids, for example, 2-phenylamino-naphthalene-2'- or -3'- or -4'-sulfonic acid, 1-aminonaphthalene-4- or -5-sulfonic acid, 2-aminonaphthalene-4- or -5- or -6- or -7-sulfonic acid or 2-aminonaphthalene-3:6- or -4:7-disulfonic acid.

The aforesaid aminobenzenes may be coupled in the usual manner, for example, by coupling the diazo-compounds obtained with sodium nitrite and hydrochloric acid with the aforesaid coupling components in known manner, for example, in a neutral or acid medium.

The conversion of the dyestuffs into their complex cobalt compounds may be carried out while the dyestuffs are present in the coupling mixture. Alternatively it may be carried out after filtering off the dyestuffs or purifying them by reprecipitation.

As agents yielding cobalt there are advantageously used salts which contain cobalt as cation, for example, cobalt acetate or cobalt sulfate. In some cases it is of advantage to use complex cobalt compounds, for example, in the form of cobalt-ammine complexes, such as cobalt tetrammine sulfates of ammonia, pyridine or monoethanolamine, or in the form of compounds which contain the cobalt bound in complex union in the anion, for example, complex cobalt compounds of alkali metal salts of aliphatic amino-carboxylic acids, hydroxy-carboxylic acids, for example, those of glycine, lactic acid or advantageously tartaric acid, such as sodium cobalt tartrate.

The treatment of the monoazo-dyestuffs with an agent yielding cobalt is advantageously carried out in a weakly acid or neutral medium, but advantageously in an alkaline medium. It is generally of advantage to use less than one atomic proportion of cobalt for each molecular proportion of dyestuff.

The treatment with the agent yielding cobalt may be carried out in a manner in itself known, for example, at a temperature within the range of 50° C. to 120° C. under atmospheric pressure, for example, under reflux, or, if desired, under superatmospheric pressure, the pH-conditions depending on the nature of the metallisation process used. Thus, for example, metallisation may be carried out under acid conditions with cobalt sulfate, or under alkaline conditions with sodium tartrate and cobalt acetate. If desired, further substances may be present during the metallization, for example, salts of organic acids, bases, organic solvents, such as alcohol, or other agents assisting the formation of complexes. With regard to the choice of the metallization process it is generally sufficient with the dyestuffs used in this invention to treat them for a short time at a temperature within the range of 70° C. to 90° C. with a salt, such as an acetate or sulfate.

The metallization process may be applied, for example, to a single dyestuff of the above Formula 1. Alternatively a mixture of different metallizable monoazo-dyestuffs of the Formula 1 may be metallized.

The complex cobalt compounds of this invention contain one atom of cobalt bound to two monoazo-dyestuff molecules, the dyestuffs being of the above Formula 1.

The new cobaltiferous dyestuffs of this invention can also be obtained by treating, instead of an ortho-hydroxy-ortho'-amino-monoazo-dyestuff of the Formula 1, a corresponding ortho-alkoxy- or ortho-acyloxy-ortho'-amino-monoazo-dyestuff with one of the aforesaid agents yielding cobalt under conditions such that the alkyl or acyl group of the ortho-alkoxy- or ortho-acyloxy-ortho'-amino-azo-grouping splits off.

The new cobaltiferous dyestuffs dissolve well in water. They are suitable for dyeing anodically oxidized aluminum from an aqueous bath. This may be carried out, for example, by dyeing the aluminum in a dyebath containing an aqueous solution which contains the cobalt compound of the monoazo-dyestuff of the Formula 1. The dyebath may also contain a salt, for example, a buffer salt, or other addition which influences the pH-value and therefore the absorption of the dyestuff from the dyebath. For example, the dyebath may be given a pH-value within the range of about 5 to about 7 by means of sodium acetate and acetic acid.

After the dyeing process the dyed aluminum is finished in the usual manner, for example, by subjecting it to the known sealing operation.

There are obtained by this process on anodically oxidised aluminum, or alloys thereof which resemble aluminum with respect to anodic oxidation, very valuable dyeings which are usually distinguished by their very good fastness to climatic conditions and light.

The following examples illustrate the invention, the parts and percentages being by weight unless otherwise stated and the relationship of parts by weight to parts by volume being the same as that of the kilogram to the liter:

*Example 1*

43.3 parts (0.1 mol) of the dyestuff, obtained by diazotizing 4:6-dinitro-2-amino-1-hydroxybenzene and coupling the diazo compound with 1-aminonaphthalene-4-sulfonic acid, are stirred in the form of a paste of about 30% strength with 1000 parts of hot water to give a homogeneous mixture. After the addition of 100 by volume of a 2 N-solution of sodium hydroxide the mixture is brought to a temperature of 75° C. The dyestuff only partially dissolves. To the suspension is added a solution of 16.9 parts of crystalline cobalt sulfate (0.06 mole) in 50 parts of hot water. After a short time the dyestuff completely dissolves. The reaction mixture is stirred for one hour at 75–80° C. The cobaltiferous dyestuff is precipitated by the addition of 100 parts by volume of 2N-acetic acid and 100 parts of sodium chloride, and then filtered off and dried. It dyes anodically oxidised aluminum by the procedure described in Example 2 deep black tints which are very fast to light.

By using, instead of the diazo-component and coupling component used in the preceding paragraph, the components given in columns II and III of the following table and treating the resulting azo-dyestuffs with cobalt sulfate, there are obtained cobaltiferous dyestuffs which dye anodically oxidised aluminum in the manner described in Example 2 the tints given in column IV.

| I | II | III | IV |
|---|---|---|---|
| 1 | 4-Nitro-6-chloro-2-amino-1-hydroxybenzene. | 1-aminonaphthalene-4-sulfonic acid. | Black. |
| 2 | 5-Nitro-2-amino-1-hydroxybenzene. | 2-aminonaphthalene-6-sulfonic acid. | Do. |
| 3 | 4:6-dinitro-2-amino-1-hydroxybenzene. | ____do____ | Greenish black. |
| 4 | ____do____ | 2-aminonaphthalene-3:6-disulfonic acid. | Do. |
| 5 | ____do____ | 1-aminonaphthalene-5-sulfonic acid. | Do. |
| 6 | ____do____ | 1-aminonaphthalene-4:7-disulfonic acid. | Do. |

*Example 2*

An article of pure aluminum is anodically oxidised in an aqueous bath which contains, per liter, 200 grams of anhydrous sulfuric acid and 10 grams of aluminum in the form of its sulfate, for one hour at 18–20° C. and at a current density of 1.5 amperes per square decimeter. The article is thoroughly rinsed with cold water, and then dyed for 30 minutes at 65° C. in an aqueous dyebath which contains, per liter, 8 grams of crystalline sodium acetate, 1 ccm of acetic acid of 40% strength and 10 grams of the cobaltiferous dyestuff obtained as described in the first paragraph of Example 1. The dyed article is thoroughly rinsed with cold water, and is then sealed in distilled water for 40 minutes at 98–100° C. It is dyed a deep black tint which is very fast to light and climatic conditions.

What is claimed is:

1. A method of dyeing anodically oxidized aluminum in fast shades which comprises immersing the anodically oxidized aluminum in an aqueous solution of complex cobalt compound sulfonated monoazo-dyestuff of the formula

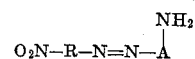

in which R represents a hydroxybenzene radical bound to the azo linkage in vicinal position relatively to the hydroxyl group, and A represents a naphthalene radical, bound to the azo linkage in vicinal position to the $NH_2$— group at a pH of about 5 to about 7 until absorption of the dyestuff onto the oxidized aluminum is achieved.

2. A method of dyeing anodically oxidized aluminum in fast shades which comprises immersing the anodically oxidized aluminum in an aqueous solution of complex cobalt compound sulfonated monoazo-dyestuff of the formula

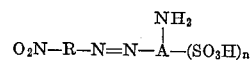

in which R represents a hydroxybenzene radical free from sulfonic and carboxylic acid groups and bearing the hydroxyl group in ortho position relatively to the azo linkage, n represents a whole positive number up to 2, and A represents a naphthalene radical, bound to the azo linkage in vicinal position to the $NH_2$— group.

3. A method of dyeing anodically oxidized aluminum in fast shades which comprises immersing the anodically oxidized aluminum in an aqueous solution of complex cobalt compound sulfonated monoazo-dyestuff of the formula

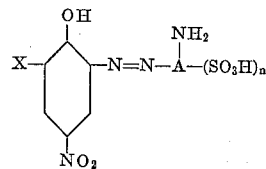

in which X represents a member of the group consisting of a chlorine atom and a nitro group, A represents a naphthalene radical bound to the azo linkage in vicinal position to the $NH_2$— group, and n represents a whole positive number up to 2.

4. A method of dyeing anodically oxidized aluminum in fast shades which comprises immersing the anodically oxidized aluminum in an aqueous solution of complex cobalt compound sulfonated monoazo-dyestuff of the formula

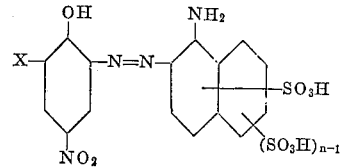

in which X represents a member of the group consisting of a chlorine atom and the nitro group and n represents a whole positive number up to 2.

5. A method of dyeing anodically oxidized aluminum in fast shades which comprises immersing the anodically oxidized aluminum in an aqueous solution of complex cobalt compound sulfonated monoazo-dyestuff of the formula

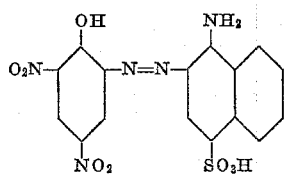

6. A method of dyeing anodically oxidized aluminum in fast shades which comprises immersing the anodically oxidized aluminum in an aqueous solution of complex cobalt compound sulfonated monoazo-dyestuff of the formula

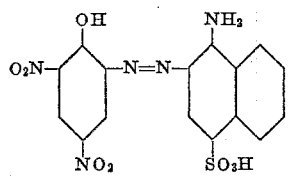

7. A method of dyeing anodically oxidized aluminum in fast shades which comprises immersing the anodically oxidized aluminum in an aqueous solution of complex cobalt compound sulfonated monoazo-dyestuff of the formula

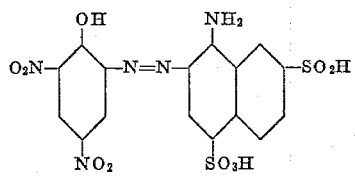

8. A method of dyeing anodically oxidized aluminum in fast shades which comprises immersing the anodically oxidized aluminum in an aqueous solution of complex cobalt compound sulfonated monoazo-dyestuff of the formula

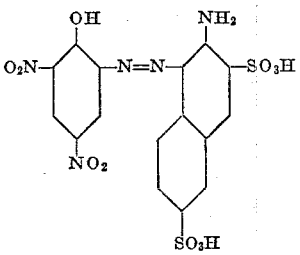

9. A method of dyeing anodically oxidized aluminum in fast shades which comprises immersing the anodically oxidized aluminum in an aqueous solution of complex cobalt compound sulfonated monoazo-dyestuff of the formula

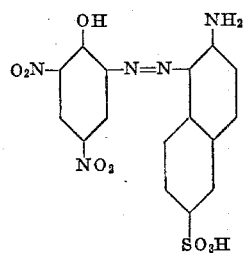

10. A method of dyeing anodically oxidized aluminum in fast shades which comprises immersing the anodically oxidized aluminum in an aqueous solution of complex cobalt compound sulfonated monoazo-dyestuff of the formula

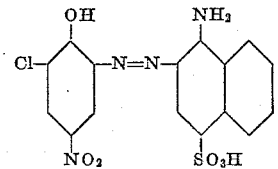

11. A method of dyeing anodically oxidized aluminum in fast shades which comprises immersing the anodically oxidized aluminum in an aqueous solution of complex cobalt compound sulfonated monoazo-dyestuff of the formula

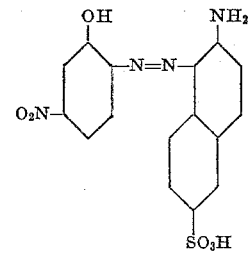

12. Fast-dyed anodically oxidized aluminum consisting essentially of anodically oxidized aluminum and complex cobalt compound of sulfonated monoazo-dyestuff of the formula

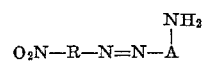

in which R represents a hydroxybenzene radical bound to the azo linkage in vicinal position relatively to the hydroxyl group, and A represents a naphthalene radical, bound to the azo linkage in vicinal position to the $NH_2$— group.

13. Fast-dyed anodically oxidized aluminum consisting essentially of anodically oxidized aluminum and complex cobalt compound of sulfonated monoazo-dyestuff of the formula

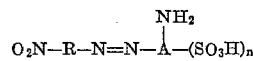

in which R represents a hydroxybenzene radical free from sulfonic and carboxylic acid groups and bearing the hydroxyl group in ortho position relatively to the azo linkage, $n$ represents a whole positive number up to 2, and A represents a naphthalene radical, bound to the azo linkage in vicinal position to the $NH_2$— group.

14. Fast-dyed anodically oxidized aluminum consisting essentially of anodically oxidized aluminum and complex cobalt compound of sulfonated monoazo-dyestuff of the formula

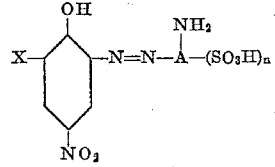

in which X represents a member of the group consisting of a chlorine atom and a nitro group, A represents a naphthalene radical bound to the azo linkage in vicinal position to the $NH_2$— group, and $n$ represents a whole positive number up to 2.

15. Fast-dyed anodically oxidized aluminum consisting essentially of anodically oxidized aluminum and complex cobalt compound of sulfonated monoazo-dyestuff of the formula

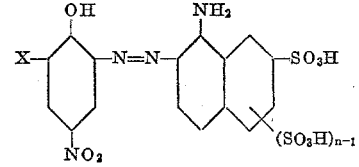

in which X represents a member of the group consisting of a chlorine atom and the nitro group and $n$ represents a whole positive number up to 2.

16. Fast-dyed anodically oxidized aluminum consisting essentially of anodically oxidized aluminum and complex cobalt compound of sulfonated monoazo-dyestuff of the formula

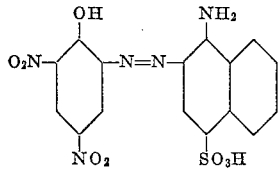

17. Fast-dyed anodically oxidized aluminum consisting essentially of anodically oxidized aluminum and complex cobalt compound of sulfonated monoazo-dyestuff of the formula

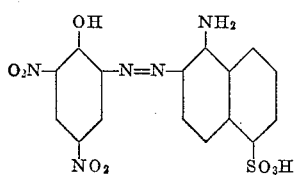

18. Fast-dyed anodically oxidized aluminum consisting essentially of anodically oxidized aluminum and complex cobalt compound of sulfonated monoazo-dyestuff of the formula

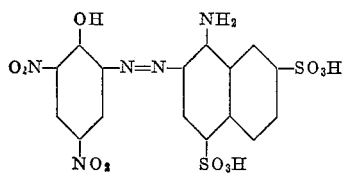

19. Fast-dyed anodically oxidized aluminum consisting essentially of anodically oxidized aluminum and complex cobalt compound of sulfonated monoazo-dyestuff of the formula

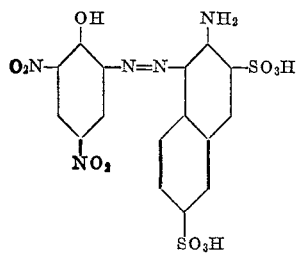

20. Fast-dyed anodically oxidized aluminum consisting essentially of anodically oxidized aluminum and complex cobalt compound of sulfonated monoazo-dyestuff of the formula

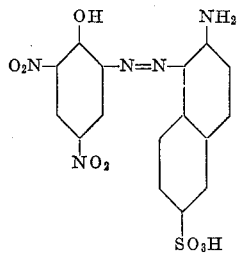

21. Fast-dyed anodically oxidized aluminum consisting essentially of anodically oxidized aluminum and complex cobalt compound of sulfonated monoazo-dyestuff of the formula

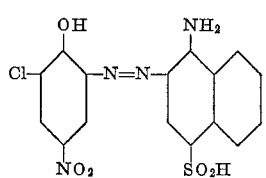

22. Fast-dyed anodically oxidized aluminum consisting essentially of anodically oxidized aluminum and complex cobalt compound of sulfonated monoazo-dyestuff of the formula

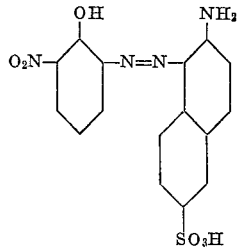

References Cited by the Examiner

UNITED STATES PATENTS

| | | | |
|---|---|---|---|
| 2,030,236 | 2/1936 | Anderau | 148—6.1 |
| 2,171,828 | 9/1939 | Hanhart et al. | 260—151 |
| 2,814,576 | 11/1957 | Zickendraht et al. | 148—6.1 |
| 2,820,784 | 1/1958 | Zickendraht et al. | 260—151 |
| 3,202,550 | 8/1965 | Grossman et al. | 148—6.1 |

ALFRED L. LEAVITT, *Primary Examiner.*

CHARLES B. PARKER, *Examiner.*

N. S. MILESTONE, R. S. KENDALL,
*Assistant Examiners.*